C. O. MASON.
HORSE RELEASER.
APPLICATION FILED NOV. 30, 1912.
1,058,448.
Patented Apr. 8, 1913.
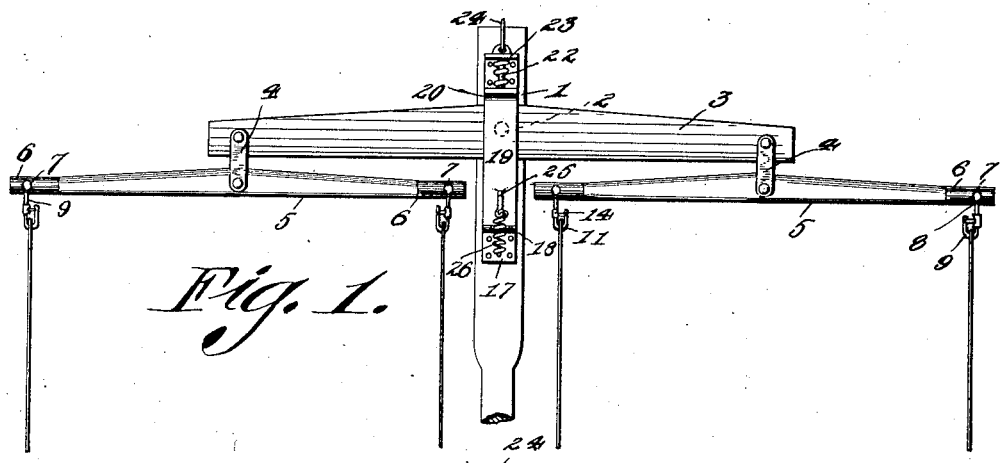
Fig. 1.
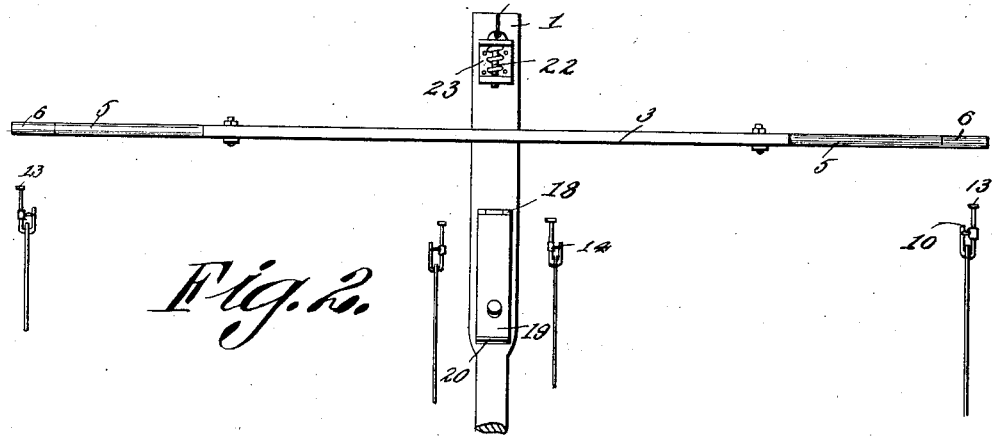
Fig. 2.
Fig. 3.   Fig. 4.   Fig. 5.
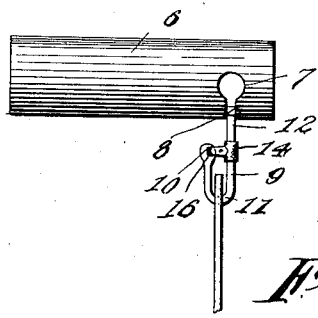 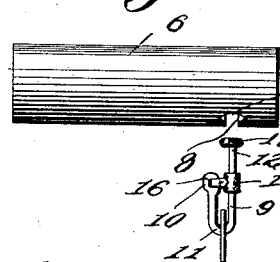 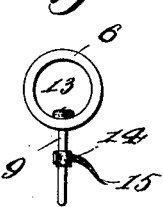
Fig. 6.
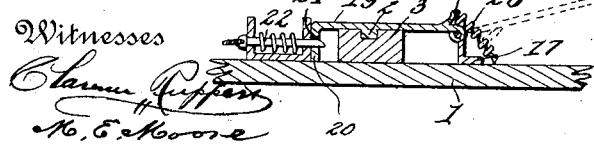
Charles O. Mason.
Inventor
Witnesses
Attorney

UNITED STATES PATENT OFFICE.

CHARLES O. MASON, OF TEXHOMA, OKLAHOMA.

HORSE-RELEASER.

1,058,448.  Specification of Letters Patent.  Patented Apr. 8, 1913.

Application filed November 30, 1912. Serial No. 734,265.

*To all whom it may concern:*

Be it known that I, CHARLES O. MASON, a citizen of the United States, residing at Texhoma, in the county of Texas and State of Oklahoma, have invented certain new and useful Improvements in Horse-Releasers, of which the following is a specification.

My invention relates to improvements in horse detachers, capable of use in connection with vehicles for single or double horse vehicles and the main object of my invention is the provision of an improvement of this character which will be disposed within easy reach of the driver and permit the instant operation of the device to release the horse in the event of an attempted run away and thus positively overcome the risk or danger to human life.

Another object of my invention is the provision of releasing devices capable of application to single or double drawn vehicles which means will be connected directly with the traces or draft means and which will operate instantly upon the attempt of the animal to run away to effect the release of the animal, the construction of the entire means being simple, inexpensive, durable and thoroughly efficient and practical in every particular.

With these objects in view, my invention consists of a horse releaser embodying novel features of construction and combination of parts substantially as disclosed herein.

Figure 1 represents a top plan view of a horse releasing mechanism constructed in accordance with and embodying my invention, the parts being shown in the position they occupy when the draft animals are drawing a vehicle in the proper manner.
Fig. 2 represents a similar view the parts being in the position they assume upon the release of the draft devices or traces which instantly allow the detachment or release of the animals from the vehicle. Fig. 3 represents an enlarged view of one of the sleeves or ferrules connected to each end of the swingle tree, the draft hook and trace being shown in normal or proper draft position. Fig. 4 represents a similar view with the sleeve or ferrule turned and the trace or draft device released. Fig. 5 represents an end view of the sleeve or ferrule and draft device in position, and Fig. 6 represents a section of the means for retaining and releasing the whiffle-tree in effecting the operation of my invention.

Referring by numeral to the drawings, in which similar characters of reference denote corresponding parts in all the views: the numeral 1 designates the pole or tongue of the vehicle to which is mounted by means of a suitable device 2 the whiffle-tree 3 to which at each end by means of the clevises 4 is swingingly mounted the pair of swingle-trees 5.

I have shown my invention as applied to a vehicle drawn by two horses, but it will be understood that the invention can be applied with equal facility to a vehicle drawn by one horse, and to the end of each swingle tree is secured a cap or ferrule 6 provided at each end with a slot having an enlarged entrance opening 7 and a reduced portion 8, and this slot provides the means of connection with the traces or draft devices 9, which have the openings 10 which receive the hooks 11, said hooks being formed with shanks 12 extending beyond the hook and carrying a head or ball 13 which in use enters the enlarged opening 7 of the slot in the caps or ferrules and retains the hooks in the reduced or narrowed portion of the slots, and the traces are prevented from accidental detachment from the hooks by means of the straps 14, which are secured to the shanks of the hooks and have their free ends 15 passed through an opening 16 of the hooks thus serving to prevent the trace straps from leaving said hooks. From this construction it will be seen that in normal position the traces are connected with the swingle tree or swingle trees, as occasion demands, and the animal draws the vehicle over the ground in the usual manner, and upon the pole or tongue is secured the angle shaped plate 17 to the upper end of which is hinged at 18 the lever 19, which is provided intermediate of its length on the under side with the lug or device 2, which serves to connect the whiffle tree 3 in proper relation to the pole or tongue, and the other end of the lever 19 is provided with a down-turned lip 20, formed with an opening 21 adapted to be engaged by the spring actuated locking bolt 22, which is mounted in the bracket 23 secured upon the pole or tongue and from this spring actuated bolt leads the cord or connection 24, which is disposed within easy reach of the driver for the purpose of operating the spring bolt when necessary to release said bolt from the lever which engages the whiffle-tree and this lever is provided adjacent its pivoted end with a lug 25 to which and the bracket plate 17 is connected a spring 26. This spring immediately upon the release of the locking bolt from engagement with the lever throws the lever upward releasing the retaining device thereon from the whiffle-tree, which action causes the whiffle-tree to turn and simultaneously turn the swingle-trees and naturally the sleeves or ferrules carried by said swingle-trees, which action causes the hooks to fall from their engagement with the caps or sleeves and the animals to be freed from the vehicle, thus effecting their instant and positive release. In short, it will be apparent that the parts are in normal and natural position as shown in Fig. 1 and the vehicle can be drawn along in the usual manner and instantly upon the animals becoming fractious and attempting to run away, the driver of the vehicle pulls the cord which releases the spring actuated locking bolt and upon its release the lever is thrown upward and the whiffle-tree drops and the draft devices are disconnected, separating the animals from the vehicle.

I claim:—

1. In a horse releaser, the combination of the swingle trees, the sleeves carried by the swingle-trees and formed each with a slot having an enlarged opening ending in a narrower portion, hooks formed each with a ball to enter the opening and be confined in the narrow portion thereof, traces connected to said hooks, and means for turning the swingle trees and releasing the hooks therefrom.

2. In a horse releaser, the combination of a pole, an angle plate secured thereto, a lever pivoted to said angle plate and formed with a lug, a spring connecting the lug of the lever with the angle plate, a keeper depending from the lever, a whiffle-tree adapted to be retained by said keeper, swingle-trees having at each end a sleeve formed with a slot, hooks engaging said slot, traces connected with said hooks, and locking means for retaining the pivoted lever to hold the parts in position and for releasing the lever to detach the hooks from the swingle-trees.

3. In a horse releaser, the combination of the angle plate, the lever pivoted to said plate and formed with a lug at one end and a lip at the other end formed with an opening, a spring connected to the lip and plate, a bracket formed with openings in line with the opening in the lip, a spring locking bolt to engage the openings of the bracket and lip to secure the lever, a connection for operating the locking bolt to release said bolt, and draft devices controlled by the action of the lever.

In testimony whereof I affix my signature in presence of two witnesses.

CHARLES O. MASON.

Witnesses:
D. E. MASON,
W. E. BENSON.

---

Copies of this patent may be obtained for five cents each, by addressing the "Commissioner of Patents, Washington, D. C."